US010250145B2

(12) United States Patent
Adragna et al.

(10) Patent No.: US 10,250,145 B2
(45) Date of Patent: Apr. 2, 2019

(54) DEVICE FOR AVOIDING HARD SWITCHING IN RESONANT CONVERTER AND RELATED METHOD

(71) Applicant: STMicroelectronics S.r.l., Agrate Brianza (IT)

(72) Inventors: Claudio Adragna, Monza (IT); Aldo Vittorio Novelli, S. Lorenzo Parabiago Mi (IT); Christian Leone Santoro, San Giuliano Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/653,145

(22) Filed: Jul. 18, 2017

(65) Prior Publication Data

US 2017/0317597 A1    Nov. 2, 2017

Related U.S. Application Data

(63) Continuation of application No. 14/860,570, filed on Sep. 21, 2015, now Pat. No. 9,735,686, which is a continuation of application No. 13/416,656, filed on Mar. 9, 2012, now Pat. No. 9,143,046.

(30) Foreign Application Priority Data

Mar. 11, 2011 (IT) .................. MI11A0388

(51) Int. Cl.
*H02M 3/335* (2006.01)
*H02M 3/337* (2006.01)
*H02M 1/00* (2006.01)

(52) U.S. Cl.
CPC ..... *H02M 3/33507* (2013.01); *H02M 3/3376* (2013.01); *H02M 2001/0058* (2013.01); *Y02B 70/1433* (2013.01); *Y02B 70/1491* (2013.01)

(58) Field of Classification Search
None
See application file for complete search history.

(56) References Cited

U.S. PATENT DOCUMENTS

| 6,154,375 | A | 11/2000 | Majid et al. | |
|---|---|---|---|---|
| 7,145,316 | B1 * | 12/2006 | Galinski, III | ......... H02M 3/156 323/288 |
| 7,315,460 | B2 | 1/2008 | Kyono | |
| 7,482,791 | B2 | 1/2009 | Stoichita et al. | |
| 7,773,398 | B2 | 8/2010 | Kyono | |
| 7,965,522 | B1 | 6/2011 | Homberger et al. | |
| 8,339,817 | B2 | 12/2012 | Halberstadt | |
| 8,824,182 | B2 | 9/2014 | Eom et al. | |

(Continued)

*Primary Examiner* — Jeffrey A Gblende
(74) *Attorney, Agent, or Firm* — Seed IP Law Group LLP

(57) ABSTRACT

A circuit includes a timer circuit configured to generate a first control signal defining a first time period and a second control signal defining a second time period. A controller is configured to control a high-side and a low-side transistor of a half-bridge circuit in response to the first and second control signals only during a first switching cycle of the half-bridge circuit. The half-bridge circuit includes a bootstrap capacitor coupled to a node between the high-side and low-side transistors. The controller turns on the low-side transistor for the first time period during the first switching cycle and configured turns off the low-side and the high-side transistors for the second time period during the first switching cycle.

19 Claims, 6 Drawing Sheets

(56) References Cited

U.S. PATENT DOCUMENTS

| | | |
|---|---|---|
| 2007/0096662 A1 | 5/2007 | Ribarich et al. |
| 2007/0126497 A1 | 6/2007 | Palaniappan et al. |
| 2008/0129269 A1 | 6/2008 | Rozsypal et al. |
| 2008/0218141 A1 | 9/2008 | Lu et al. |
| 2010/0134091 A1* | 6/2010 | Eom ................. H02M 1/36 324/76.11 |
| 2010/0226050 A1 | 9/2010 | Koo et al. |
| 2010/0231297 A1* | 9/2010 | Buitendijk ............ H03F 1/26 330/251 |
| 2010/0259238 A1 | 10/2010 | Cheng |
| 2011/0018613 A1* | 1/2011 | Wang ............... H02M 3/1588 327/530 |
| 2011/0050322 A1* | 3/2011 | Sicard ............ H03K 17/04206 327/419 |
| 2011/0156669 A1 | 6/2011 | Ishii |

* cited by examiner

DEVICE FOR AVOIDING HARD SWITCHING IN RESONANT CONVERTER AND RELATED METHOD

BACKGROUND

Technical Field

The present disclosure relates to a device for avoiding hard switching of converters, in particular in resonant converters, and a related method.

Description of the Related Art

Resonant converters are known in the state of the art, using half-bridge or full-bridge circuit topologies. In the case of a half-bridge resonant converter, the switching elements comprise a high-side transistor and a low-side transistor connected in series between an input voltage and ground. A square wave having a high value corresponding to the input voltage and a low value corresponding to ground may be generated by conveniently switching the two transistors. A small time interval Td called "dead time", during which the transistors are turned off, is typically added immediately after each of them is turned off.

In resonant converters, the square wave generated by the half-bridge is applied to the primary winding of a transformer by a resonant network which comprises at least one capacitor and one inductor; the secondary winding of the transformer is connected with a rectifier circuit and a filter to provide a DC output voltage. The value of the output voltage depends on the frequency of the square wave.

The so-called LLC resonant converter is often used among the several types of resonant converters, especially the half-bridge LLC resonant convertor. The LLC designation comes from the resonant circuit employing two inductors (L) and a capacitor (C) and a schematic circuit of an LLC resonant converter is shown in FIG. 1. The resonant converter 1 comprises a half-bridge of transistors Q1 and Q2, with respective body diodes Db1 and Db2, between the input voltage Vin and ground GND and driven by a driver circuit 3 by means of the signals HSGD and LSGD. The common terminal HB between transistors Q1 and Q2 is connected to a resonant circuit 2 comprising a series of a capacitor Cr, an inductance Ls, and a parallel circuit that includes another inductance Lp connected in parallel to a primary of a transformer 10 with a center-tap secondary. The two windings of the center-tap secondary of transformer 10 are connected to the anodes of two diodes D1 and D2, the cathodes of which are both connected to the parallel of a capacitor Cout and a resistance Rout. The output voltage Vout of the resonant converter is the voltage across said parallel, while the output current Iout flows through the resistance Rout.

Resonant converters offer considerable advantages as compared to traditional switching converters (non-resonant, typically PWM-controlled (Pulse Width Modulation)): waveforms without steep edges, low switching losses in the power switches due to "soft" switching thereof, high conversion efficiency (>95% is easily reachable), ability to operate at high frequencies, low EMI (electro-magnetic interference) generation and, finally, high power density (i.e., enabling to build conversion systems capable of handling considerable powers levels in a relatively small space).

However, the same resonant converters are affected by certain disadvantages during the start-up step. In said step, when the high-side transistor Q1 is turned on the first time, the voltage seen by the primary winding is substantially equal to the power supply voltage. In the successive semi-period of the square wave, when the low-side transistor Q2 is turned on, the voltage seen by the primary winding is substantially equal to the voltage across the capacitor Cr; therefore, the current flowing through the resonant network increases more quickly during the turning on of the high-side transistor, while decreases less quickly during the turning on of the low-side transistor. Thereby, when the low-side transistor is turned off again, the current flows through the body diode Db2 thereof. When the high-side transistor is turned on again, a reverse voltage is developed across the body diode Db2 of the low-side transistor, while the diode Db2 is still conducting. Under said conditions, the high-side transistor is turned on under hard switching conditions and the diode Db2 is stressed in reverse recovery. Therefore, both the high-side transistor and the low-side transistor are conductive in the same time period by short-circuiting the supply terminal with the ground terminal until the body diode Db2 is recovered. Under such conditions, the voltage at the terminals of the transistor may vary so quickly that the intrinsic, parasitic bipolar transistor of the MOSFET transistor structure may be triggered, thus causing a shoot-through condition which may cause the destruction of the transistor in few microseconds.

In driving devices of high-voltage half-bridges, the power supply voltage of the driving section of the high-side MOSFET Q1 is typically obtained by means of a so-called bootstrap system, shown in FIG. 2. According to this method, the capacitor Cboot (bootstrap capacitor), is coupled with the middle point HB of the half-bridge and acts as power buffer to supply the driver 31, i.e., the part of driver 3 which drives the high-side transistor Q1. The capacitor Cboot is charged by a low-voltage generator Vcc through a high-voltage diode Dboot (bootstrap diode) with a voltage Vboot when the middle point HB of the half-bridge is at a low voltage level (that is, when the low-side transistor Q2 is turned on). When the high-side MOSFET Q1 is turned on and the middle point HB of the half-bridge is high, the diode Dboot isolates the capacitor Cboot from the low-voltage line.

Hence, to correctly drive the high-side MOSFET Q1 from the first turning-on cycle, the half-bridge is started by first turning on the low-side MOSFET Q2 so as to pre-charge the bootstrap capacitor Cboot.

In certain cases, the bootstrap diode Dboot may be provided by an integrated structure inside the driver device 3, as shown in FIG. 3. In this case, indeed, the component acting as the diode is a MOSFET transistor M, which is synchronously driven with the low-side MOSFET Q1, so as to obtain the above-mentioned functionality.

As compared to a real diode (one of ultrafast type would be used), the integrated bootstrap diode has a considerably higher resistance (of a hundred ohms as compared to hundreds of megaohms of the ultrafast diode). Accordingly, while the charge of the bootstrap capacitor (which is of hundreds of nF) is almost instantaneous with the diode, longer times (of tens of μs) occur with the integrated diode.

For this reason, it is usual that the first turning on of the low-side MOSFET in the control devices of half-bridges converters with integrated bootstrap diodes is intentionally longer than the following ones during the first switching cycles.

During the pre-charging cycle of the bootstrap capacitor Cboot, having a duration Tpc, if the resonant capacitor Cr is initially charged (this always happens if the split capacitor configuration of Cr is used, shown in FIG. 4), the current Ir will circulate in the resonant circuit. Such a current is a sinusoidal wave at the resonant frequency $f_R=1/T_R$ of the resonant circuit (Cr, Ls), the peak amplitude of which is equal to the voltage across Cr divided by the characteristic impedance of the resonant circuit itself.

If, at the end of the time period Tpc, the low-side MOSFET Q2 works in the third quadrant (i.e., the current passes from the source terminal to the drain terminal), the current will continue to flow through its body diode Db2, even after the MOSFET Q2 turns off. Therefore, after the dead time Td elapses, the high-side MOSFET Q1 is turned on while the body diode of Q2 is conducting, thus stressing the reversed recovery thereof. FIG. 5 shows the waveforms of the signals HSGD, LSGD, the half-bridge voltage VHB, the voltage Vcr at the terminals of capacitor Cr, the current Ir, the current IQ2 flowing through the transistor Q2, and the current Ilp which flows through the inductor Lp.

The low-side MOSFET Q2 will conduct into the third quadrant at the end of the pre-charging time Tpc if the condition $$\frac{K}{2} \times T_R < Tpc < \frac{K+1}{2} \times T_R$$

is met, where K is an odd integer.

Resonance frequency $f_R=1/T_R$ of the LLC circuit is typically selected based on other considerations, whereby restraining it to the time period Tpc is not generally acceptable.

BRIEF SUMMARY

A possible solution is that of modulating the time period Tpc so that the above-mentioned condition does not occur. This may be done by detecting the current which flows in the resonant circuit and terminating the time period Tpc by means of a zero comparator, when the resonant current is negative and thus is flowing between low-side drain and source. However, if the resonant capacitor Cr is initially drained, the currents which circulate during the time period Tpc are highly small and the zero comparator could never detect the current being negative due to the inevitable input offset thereof.

One embodiment of the present disclosure is a device for avoiding the hard switching in converters, in particular in resonant converters, which overcomes the aforesaid drawback.

In one embodiment of the present disclosure, a circuit includes a timer circuit configured to generate a first control signal defining a first time period and a second control signal defining a second time period. A controller is configured to control a high-side and a low-side transistor of a half-bridge circuit in response to the first and second control signals only during a first switching cycle of the half-bridge circuit. The half-bridge circuit includes a bootstrap capacitor coupled to a node between the high-side and low-side transistors. The controller turns on the low-side transistor for the first time period during the first switching cycle and configured turns off the low-side and the high-side transistors for the second time period during the first switching cycle.

In another embodiment, a method includes precharging a bootstrap capacitor of a resonant converter for a first time period during an initial switching cycle of the resonant converter, maintaining a high-side transistor and a low-side transistor in a half-bridge circuit of the resonant converter switched off for a second time period after the first time period during the initial switching cycle, and switching on the high-side transistor after expiration of the second time period during the initial switching cycle.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which.

DETAILED DESCRIPTION

Figure 1:
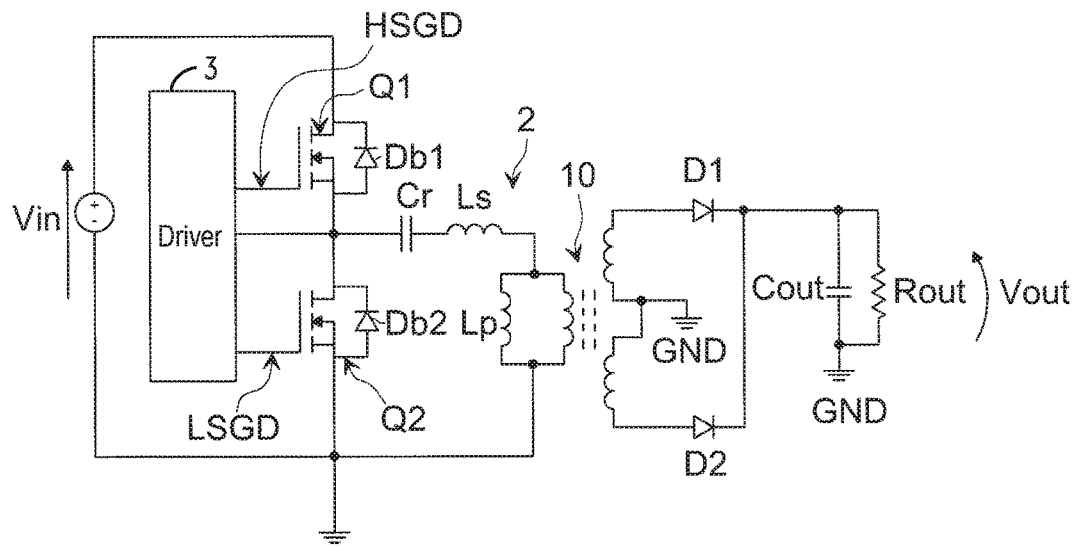
FIG. 1 is a circuit schematic of a resonant converter of LLC type in accordance with the known art.
Figure 2:
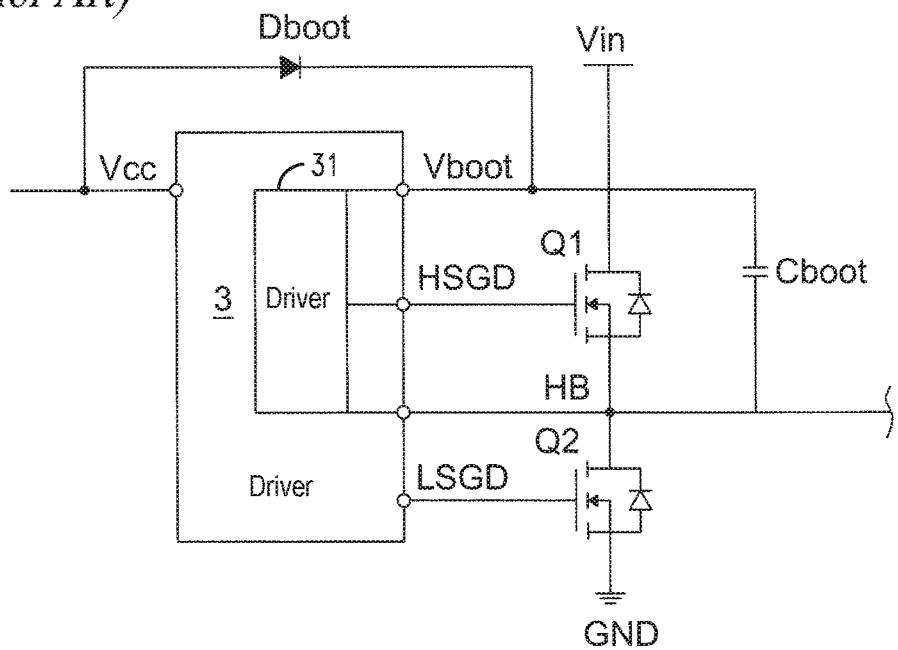
FIG. 2 is a circuit schematic of the driver of the half-bridge of the converter in FIG. 1 in accordance with the known art.
Figure 3:
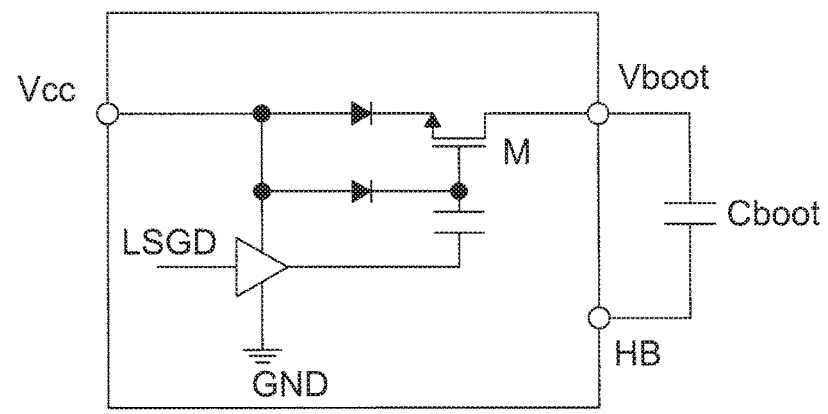
FIG. 3 is a circuit schematic of another possible implementation of the boost diode in accordance with the known art.
Figure 4:
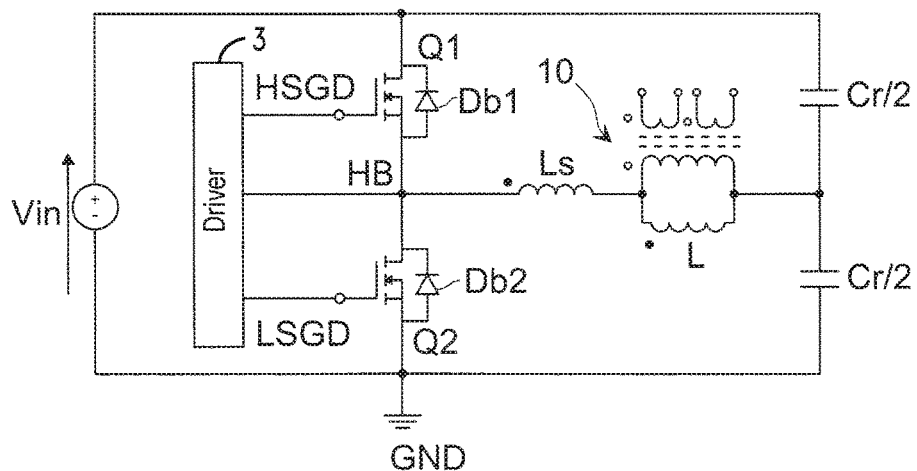
FIG. 4 corresponds to the circuit in FIG. 1 with split-capacitor configuration.
Figure 5:
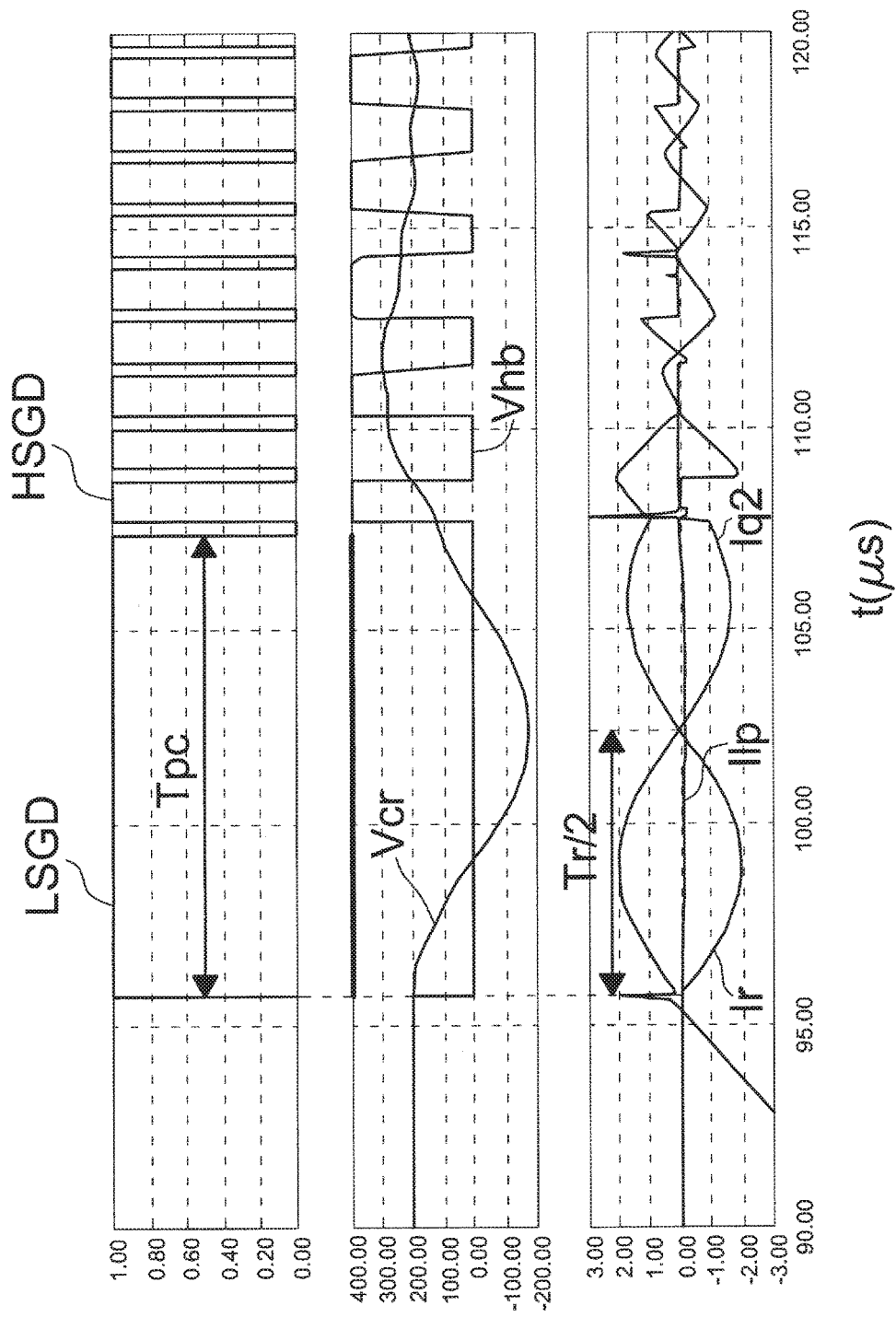
FIG. 5 shows time diagrams of certain voltages and currents involved in the circuit in FIG. 4 or in that in FIG. 1 if the voltage initially present at the terminals of capacitor Cr is not null.
Figure 6:
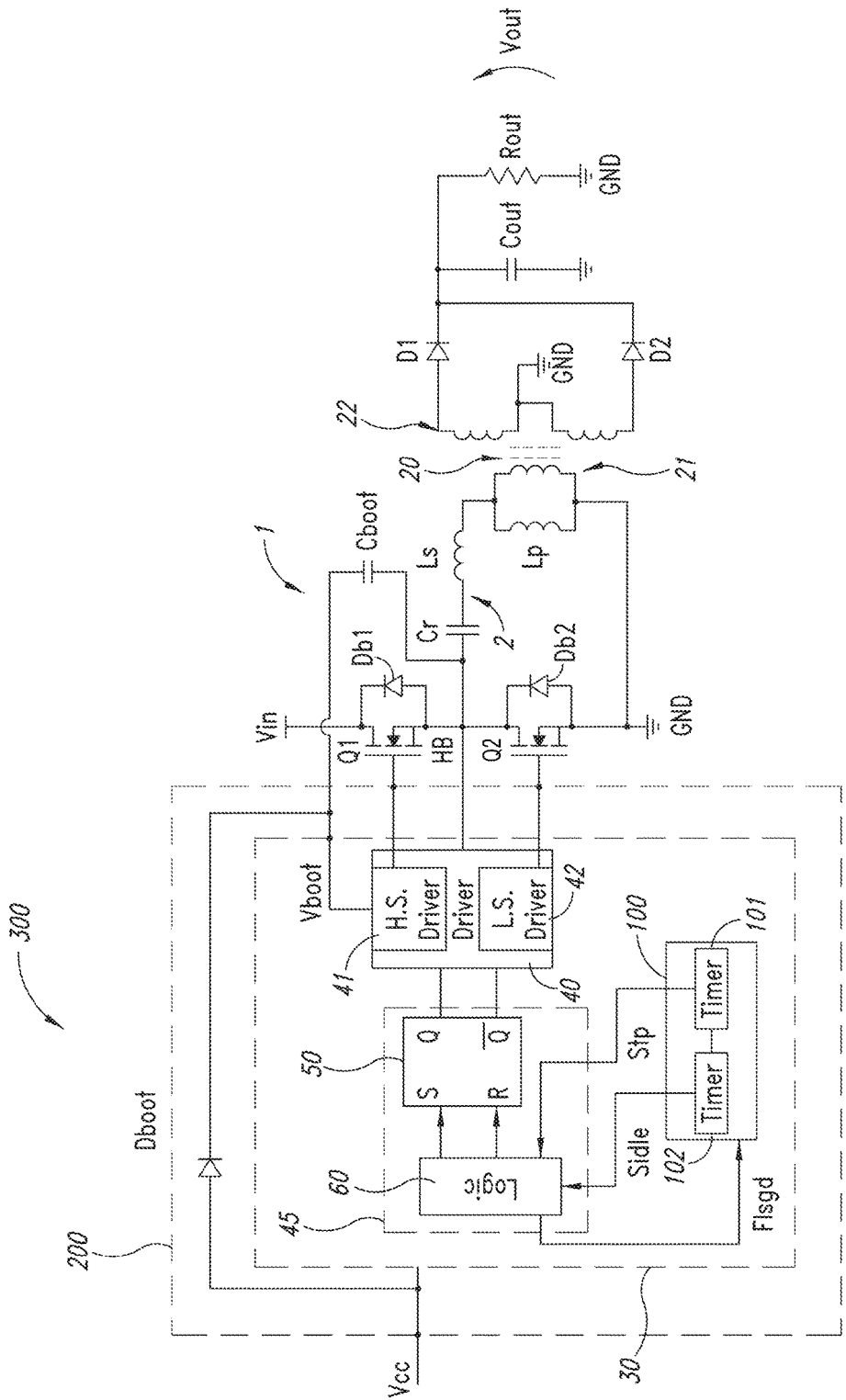
FIG. 6 is a circuit schematic of a LLC resonant converter with a driving circuit provided with a device to avoid the hard switching in resonant converters in accordance with the present disclosure.

FIG. 6 shows a control device 30 for a converter 1, in particular a resonant converter, in accordance with the present disclosure. The resonant converter 1, preferably a DC-DC converter, comprises a half-bridge of transistors Q1 and Q2, with respective body diodes Db1 and Db2, between the input voltage Vin and ground GND, and driven by the control circuit 30 by means of signals HSGD and LSGD. The common terminal HB between the transistors Q1 and Q2 is connected to a resonant circuit 2 comprising a series of a capacitor Cr, an inductance Ls and a parallel circuit that includes another inductance Lp connected in parallel to a transformer 20 having a primary 21 and a center-top secondary 22. The two windings of the center-top secondary of transformer 20 are connected to the anodes of two diodes D1 and D2, the cathodes of which are both connected to the parallel of a capacitor Cout and a resistance Rout. The output voltage Vout of the resonant converter is the voltage across said parallel, while the output current Iout flows through the resistance Rout.

There is a capacitor Cboot (connected to the terminal HB of the half-bridge), which acts as a power buffer to supply the control circuit 30, in particular for a high-side driver 41 of driver 40, the driver 41 being configured to drive the high-side transistor Q1. The capacitor Cboot is charged by a low-voltage generator Vcc through a high-voltage diode Dboot (bootstrap diode) with a voltage Vboot when the middle point HB of the half-bridge is at a low voltage level (that is, when the low-side transistor Q2 is turned on). When the high-side MOSFET Q1 is turned on and the middle point HB of the half-bridge is high, the diode Dboot isolates capacitor Cboot from the low-voltage line. The control device 30 is integrated in a semiconductor material chip 200 so as to provide an integrated circuit 300. The diode Dboot is preferably within the integrated circuit 300, and thus integrated with the control device 30 in the semiconductor material chip 200.

The control circuit 30 comprises the driving block 40 for driving transistors Q1 and Q2 and the driving block 40 is supplied by a controller 45 that includes a set-reset flip-flop 50 and a logic circuit 60. The controller 45 is able to cause the driving block 40 to send the driving signals of transistors Q1 and Q2 for on and turning off the transistors Q1 and Q2, so that a periodic square-wave voltage is applied to the primary 21 of the transformer. The square-wave voltage varies between a high voltage level, preferably corresponding to the input voltage Vin, and a low voltage level, preferably corresponding to ground GND. The driving block 40 comprises a high-side driver 41 and a low-side driver 42 for respectively driving the transistors Q1 and Q2 by means of the signals HSGD and LSGD, respectively. The controller 45 sets a short (some hundreds of nanoseconds) time period to elapse between the instant of turning off one of the transistors Q1, Q2 and the instant of turning on the other of the transistors Q1, Q2, which is called dead time Td in which both the transistors Q1 and Q2 are turned off. The controller 45 sets the turning on of the half-bridge Q1-Q2 to start when turning on the low-side transistor Q2.

The control circuit 30 also comprises a timer circuit 100 adapted to avoid the hard switching in the resonant converter 1. The timer circuit 100 comprises a first timer 101 adapted to set a pre-charging period Tpc for transistor Q2. In particular, the first timer circuit 101 sends a signal Stp to the logic circuit 60 of the controller 45 to set the first turning on of the low-side transistor Q2 to have a duration given by time period Tpc, i.e., a time period useful for pre-charging the capacitor Cboot. The time period Tpc is of the order of tens of microseconds and certainly greater than the dead time Td.

The timer circuit 100 also comprises a second timer 102 adapted to control the turning off of the low-side transistor Q2 and the high-side transistor Q1 over a time period Tidle following the time period Tpc. The second time period Tidle occurs between the final instant Tfinpc of the pre-charging period Tpc of capacitor Cboot and the starting instant Tin of the switching of the half-bridge which, for example, may coincide with the initial instant of turning on the high-side transistor Q1, or with the turning on of the low-side transistor Q2 again. The time period Tidle is to be longer than the time period Tpc. The time period Tidle is to be long enough that any possible current oscillations due to capacitor Cr firstly charged are reduced to no longer inject the body diodes Db1 and Db2 and short enough so that the bootstrap capacitor Cboot is not discharged to compromise the correct driving of the high-side transistor Q1. A possible value is Tidle≈5·Tpc, for example.

The second timer 102 thus sends a signal Sidle to the logic circuit 60 to set the turning off of low-side transistor Q2 and high-side transistor Q1 over a time period Tidle following the time period Tpc, i.e., between the final instant Tfinpc of the pre-charging period Tpc of capacitor Cboot and the starting instant Tin of the switchings of the half-bridge which, for example, may coincide with the initial instant of turning on the high-side transistor Q1, but also with the turning on of the low-side transistor Q2 again.

The logic circuitry 60 sends set and reset signals to S and R inputs respectively, of the flip-flop 50, the outputs Q and $\overline{Q}$ of which are at the input to the drivers 41, 42 of transistors Q1 and Q2. The signals Stp and Sidle are received at inputs of the control logic circuitry 60 to conveniently modify the set and reset signals that are output from the circuitry 60 and received at the S, R inputs of the flip-flop 50. The timers 101 and 102 are configured to operate with the logic circuitry 60 only at the initial step of the first switching cycle of the half-bridge; after the first switching cycle of the half-bridge, the timers 101 and 102 remain inactive.

Figure 7:
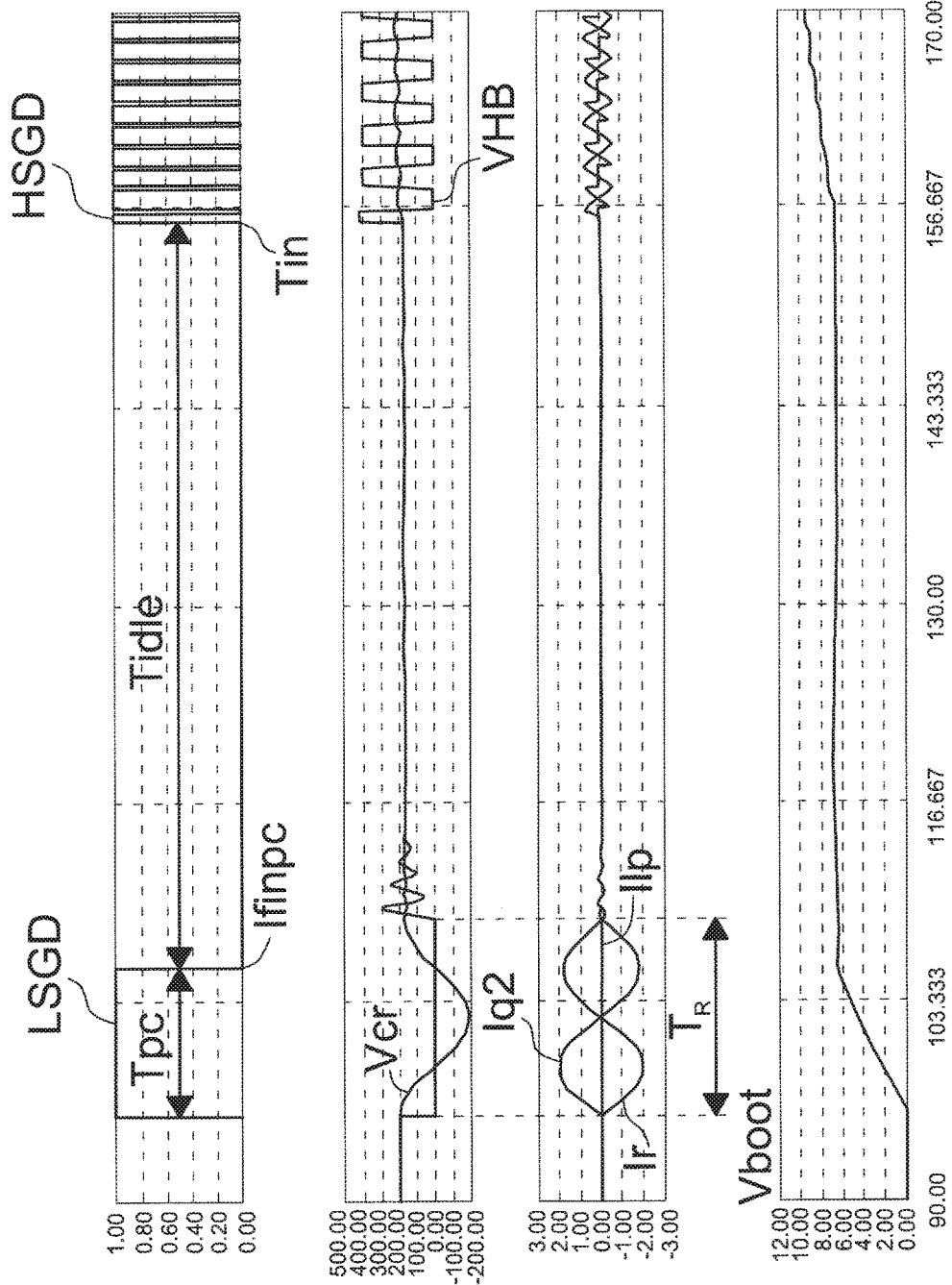
FIG. 7 shows time diagrams of certain voltages and currents involved in the circuit in FIG. 6.

FIG. 7 shows the waveforms of the signals HSGD, LSGD, the half-bridge voltage VHB, the voltage Vcr across the capacitor Cr, the current Ir, the current IQ2 flowing through the transistor Q2, the current Ilp flowing through in the inductor Lp, and the voltage Vboot across the capacitor Cboot for the converter in FIG. 6.

Figure 8:
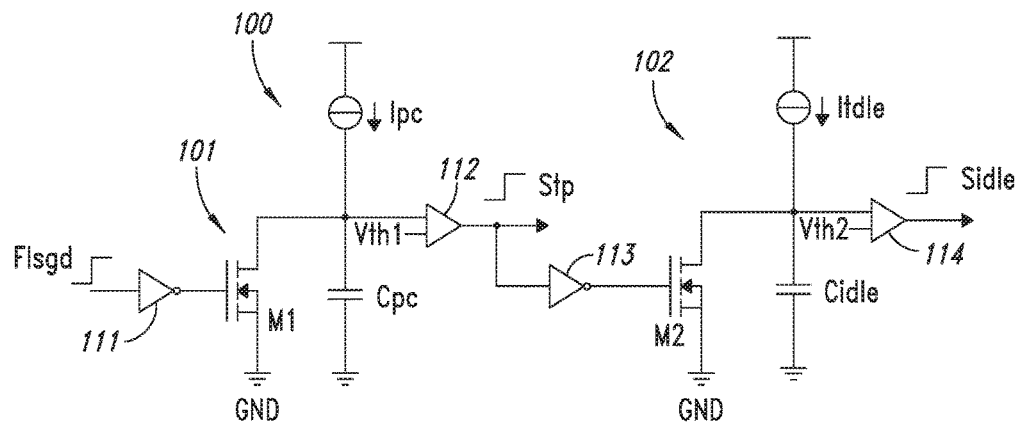
FIG. 8 shows a possible circuit implementation of the device for avoiding hard switching in the resonant converters in accordance with the present disclosure.

FIG. 8 shows a possible implementation of the timer circuit 100. In said implementation, the durations of the time periods Tpc and Tidle may be implemented by means of the time periods for charging the two different capacitors Cpc and Cidle. In the instant when the low-side transistor Q2 is turned on for the first time by means of the first impulse of signal LSGD, the logic circuit 60 provides a signal at high logic level, indicated by Flsgd, via a NOT gate 111, to a MOS transistor M1 having its drain terminal connected to a terminal of the capacitor Cpc (the other terminal of which is connected to ground GND) and its source terminal connected to ground GND. The MOS transistor M1 is off and therefore a current generator Ipc may charge the capacitor Cpc. A comparator 112 compares the voltage Vpc across the capacitor Cpc is compared with a first threshold voltage Vth1 and emits the input signal Stp to circuitry 60. The signal Stp, typically at low logic level, e.g., at ground GND, is brought to high logic level when Vcp=Vth1. The high logic level of signal Stp is applied by means of a NOT gate 113, to a MOS transistor M2 having its drain terminal connected to a terminal of capacitor Cidle (the other terminal of which is connected to ground GND) and the source terminal connected to ground GND. The transistor M2 is turned off and therefore a current generator Iidle may charge the capacitor Cidle. A comparator 114 compares the voltage Vidle across the capacitor Cidle with a threshold voltage Vth2 and outputs the signal Sidle to an input of the circuitry 60. The signal Sidle, typically at low logic level, e.g., at ground GND, is brought to high logic level when Vidle=Vth2 at the instant Tin. The time period Tidle is given by instant Tcpfin, when signal Stp is brought to the high logic level up to the starting instant Tin of the switchings of the half-bridge which, for example, may coincide with the initial instant of turning on the high-side transistor Q1, or with the turning on of the low-side transistor Q2 again.

Figure 9:
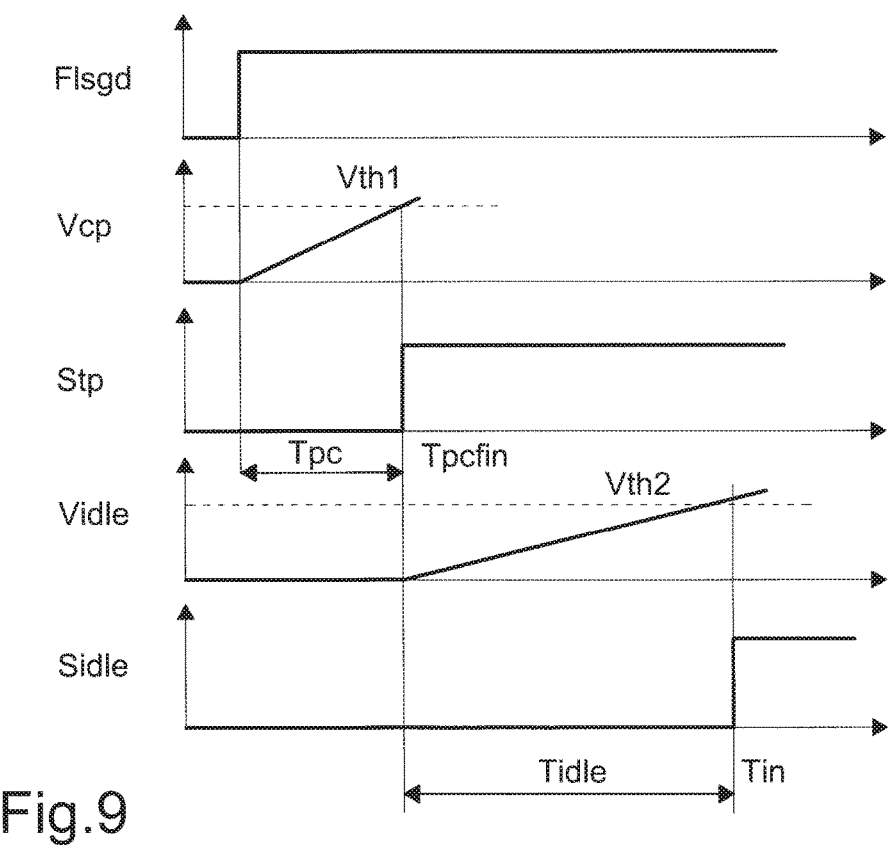
FIG. 9 shows time diagrams of certain voltages and currents involved in the circuit in FIG. 8.

FIG. 9 shows the time diagrams of the signals Flsgd, Vcp, Vidle, Stp and Sidle. The time periods Tpc and Tidle are the time periods for charging the respective capacitors Cpc and Cidle.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   precharging a bootstrap capacitor of a resonant converter for a first time period during an initial switching cycle of the resonant converter;
   maintaining a high-side transistor and a low-side transistor in a half-bridge circuit of the resonant converter switched off for a second time period after the first time period during the initial switching cycle, a half-bridge node being defined at an interconnection of the high-side and low-side transistors and each of the high-side and low-side transistors including a body diode and the second time period being long enough to allow any oscillations of a half-bridge voltage on the half-bridge node to reduce to a level that will not cause current to flow through the body diodes of the high-side and low-side transistors; and
   switching on the high-side transistor after expiration of the second time period during the initial switching cycle.

2. The method of claim 1, wherein precharging the bootstrap capacitor comprises turning on the low-side transistor for the first time period.

3. The method of claim 1 further comprising turning the high-side and low-side transistors on and off without relation to the first and second time periods during switching cycles after the initial switching cycle.

4. The method of claim 1, wherein the second time period starts upon termination of the first time period.

5. The method of claim 1, wherein a voltage across the bootstrap capacitor is used to turn on the high-side transistor and wherein the second time period is short enough to prevent the bootstrap capacitor from being discharged to reduce the voltage across the bootstrap capacitor to a level that will not allow proper turning on of the high-side transistor.

6. The method of claim 5, wherein the second time period is equal to five times the first time period.

7. A circuit, comprising:
   a timer circuit configured to generate a first control signal defining a first time period and a second control signal defining a second time period; and
   a controller configured to control a high-side and a low-side transistor in response to the first and second control signals, a common node being defined between the high-side and low-side transistors and each of the high-side and low-side transistors having a body diode, the controller configured to turn on the low-side transistor for the first time period and configured to turn off the high-side and the low-side transistors for the second time period to allow any oscillations on the common node to diminish to a level that does not cause current to flow through the body diodes.

8. The circuit of claim 7, wherein the second time period immediately follows the first time period and the second time period has a longer duration than the first time period.

9. The circuit of claim 8, wherein the second time period is equal to five times the first time period.

10. The circuit of claim 7, wherein the controller is configured to turn on the low-side transistor for the first time period to precharge the bootstrap capacitor to a level sufficient to properly turn on the high-side transistor.

11. The circuit of claim 7, wherein the controller is configured to control the high-side and low-side transistors in response to the first and second control signals only during a first switching cycle of the half-bridge circuit.

12. The circuit of claim 7, wherein the controller is further configured to control the turning on and off of the high-side and low-side transistors without relation to the first and second time periods during switching cycles after the first switching cycle.

13. The circuit of claim 7, wherein the timer circuit comprises a first timer configured to time the first time period and a second timer configured to time the second time period.

14. The circuit of claim 13, wherein the first timer circuit includes a first capacitor that is charged to time the first time period and the second timer circuit includes a second capacitor that is charged to time the second time period.

15. The circuit of claim 14, wherein first timer circuit is configured to generate a stop signal in response to a voltage across the first capacitor reaching a first threshold and wherein the second timer circuit is configured to start charging the second capacitor in response to the stop signal.

16. A switching converter, comprising:
   a switching circuit including a half-bridge circuit having a high-side and a low-side switch coupled to each other at an intermediate node;
   a bootstrap capacitor coupled to the intermediate node; and
   a control circuit that in operation controls the switching circuit, the control circuit including:
     a timer circuit that in operation generates a first control signal defining a first time period and a second control signal defining a second time period; and
   a controller that in operation controls the high-side and a low-side switches in response to the first and second control signals, and that in operation turn on the low-side switches for the first time period and turns off the low-side and the high-side switches for the second time period to allow any oscillations on the intermediate node to diminish to a desired level, and that in operation controls the high-side and low-side switches independent of the first and second control signals during switching cycles subsequent to the initial switching cycle.

17. The switching converter of claim 16, where each of the high-side and low-side switches comprises a MOSFET.

18. The switching converter of claim 16, wherein the switching converter comprises an LLC type resonant converter.

19. The switching converter of claim 16, wherein the switching converter comprises a DC-DC resonant converter.

* * * * *